(12) United States Patent
Sakata et al.

(10) Patent No.: US 6,703,807 B2
(45) Date of Patent: Mar. 9, 2004

(54) METHOD AND APPARATUS FOR CONTROLLING STARTING OF SYNCHRONOUS MOTOR AND ELECTRIC PUMP FOR CONTROLLING WORKING FLUID OF MOTOR VEHICLE DRIVING SYSTEM USING THE APPARATUS

(75) Inventors: Takatoshi Sakata, Yamatotakada (JP); Yasuo Yokoi, Hirakata (JP)

(73) Assignees: Koyo Seiko Co., Ltd., Osaka (JP); Nihon Inverter Corporation, Osaka (JP)

( * ) Notice: Subject to any disclaimer, the term of this patent is extended or adjusted under 35 U.S.C. 154(b) by 0 days.

(21) Appl. No.: 10/077,994

(22) Filed: Feb. 20, 2002

(65) Prior Publication Data

US 2002/0113568 A1 Aug. 22, 2002

(30) Foreign Application Priority Data

Feb. 21, 2001 (JP) .......................... 2001-044677

(51) Int. Cl.[7] .............................. H02P 1/46; H02P 3/18; H02P 5/28
(52) U.S. Cl. ...................... 318/700; 318/138; 318/254; 318/439; 318/705; 318/716; 318/721; 318/722; 318/727; 318/798
(58) Field of Search ................. 318/138, 254, 318/439, 700, 727, 705, 716, 721, 722, 798

(56) References Cited

U.S. PATENT DOCUMENTS

| | | | | | |
|---|---|---|---|---|---|
| 4,628,240 A | * | 12/1986 | Kurakake et al. | ........... | 318/723 |
| 4,928,043 A | * | 5/1990 | Plunkett | ..................... | 318/254 |
| 5,036,264 A | * | 7/1991 | Ueki | ........................... | 318/254 |
| 5,182,499 A | * | 1/1993 | Inaji et al. | ................... | 318/254 |
| 5,811,949 A | * | 9/1998 | Garces | ........................ | 318/448 |
| 6,025,691 A | * | 2/2000 | Kawabata et al. | ........... | 318/700 |

FOREIGN PATENT DOCUMENTS

| | | | | |
|---|---|---|---|---|
| JP | 07-123774 | | 5/1995 | |
| JP | 09-121586 | | 5/1997 | |
| JP | 2000-037093 | | 2/2000 | |
| JP | 2000-046166 | * | 2/2000 | ........... F16H/61/00 |

* cited by examiner

Primary Examiner—Robert Nappi
Assistant Examiner—Tyrone W Smith
(74) Attorney, Agent, or Firm—Rabin & Berdo, P.C.

(57) ABSTRACT

A method for controlling starting of a synchronous motor having an excellent starting ability and capable of coming into a commutation mode in a short time is provided. An AC current having a predetermined frequency is supplied to a field coil 81 of a synchronous motor 8 by an inverter 91, thereby starting the synchronous motor 8. By detecting a terminal voltage of the field coil 81 of the synchronous motor 8 at the starting time, and decreasing a voltage waveform component based on the AC current supplied by the inverter 91 from the detected voltage, the waveform is corrected so that the voltage waveform component based on the counter electromotive force can be confirmed (110). And after integrating the corrected waveform (111) and converting the same into a square wave (112), a phase difference between the same (104) and an output of a 120° energization waveform generating circuit 102 is detected to be fed back.

5 Claims, 6 Drawing Sheets

METHOD AND APPARATUS FOR CONTROLLING STARTING OF SYNCHRONOUS MOTOR AND ELECTRIC PUMP FOR CONTROLLING WORKING FLUID OF MOTOR VEHICLE DRIVING SYSTEM USING THE APPARATUS

BACKGROUND OF THE INVENTION

1. Field of the Invention

The present invention relates to a method and an apparatus for controlling the start of a synchronous motor, and especially, to an apparatus suitable for controlling the start of a synchronous motor mounted on a motor vehicle and an electric pump for controlling a working fluid of a motor vehicle driving system in which said apparatus is applied. This electric pump is, in concrete terms, an electric pump for controlling flow rate of a working fluid (oil or the like) used in a driving system mounted on a motor vehicle such as a CVT (Continuously Variable Transmission) or an automatic transmission, or in a steering system mounted on a motor vehicle such as an oil hydraulic steering apparatus.

2. Description of Prior Art

Among transmissions, such as the CVT, to be mounted on a motor vehicle, there are oil hydraulic type transmissions in which oil is used as a working fluid. For example, in Japanese Unexamined Laid-Open Patent Publication No. 2000-46 166, such a prior art of the CVT is disclosed.

This prior art has such a mechanism that, when the rotation frequency of an engine is not less than a predetermined rate, a working fluid is supplied to an automatic transmission by a mechanical pump; when the rotation frequency of the engine is less than the predetermined rate, the working fluid is supplied to the automatic transmission by an electric pump and the mechanical pump; and when the engine is stopped, the working fluid is supplied to the automatic transmission by the electric pump.

In a transmission such as a CVT, an electric pump has been conventionally used as an auxiliary means for supplying a working fluid. Further, in an oil hydraulic power steering apparatus, an electric pump is also used as an auxiliary means for supplying oil as a working fluid.

Otherwise, it may possible to supply a working fluid only by an electric pump (that is, the electric pump is not used for assisting a mechanical pump but is used as a main pump) in order to fulfill the recent energy-saving requirement of a motor vehicle.

In an electric pump for supplying or assisting to supply a working fluid used in a driving system or a steering system mounted on a motor vehicle, a brush-equipped motor has been conventionally used as its driving source. However, a driving system or a steering system mounted on a motor vehicle is disposed in an engine room or the like which is in a high temperature environment having an atmospheric temperature of not less than 120° C. Consequently, there is a problem that the brush is worn hard and has only a short life.

Therefore, the inventors have examined the use of a brushless motor as a driving source of an electric pump. A brushless motor is a synchronous motor made to have a characteristic equivalent to that of a DC motor, and it is an apparatus including a synchronous motor and a driver for driving it.

In order to use a synchronous motor as a brushless motor, generally, a sensor for detecting the angular position of a rotor is required. An AC current in correspondence with an angular position of the rotor detected by the sensor is generated by an inverter and supplied to a field coil. The most ordinary sensor is constituted by a Hall element, but there is a problem that a Hall element has a low degree of heat tolerance and loses its function at about 120° C. Consequently, in a synchronous motor incorporated into an electric pump, a Hall element cannot be used as a sensor.

Therefore, the inventors of the present invention have thought to use a brushless motor having no sensor as a driving source of an electric pump. Usually, a counter electromotive force is generated when a rotor rotates. Since such the a counter electromotive force has a waveform synchronous with the rotation, the angular position of the rotor can be detected by detecting the counter electromotive force. However, the inventors have encountered a problem that, at the starting time of the motor, the rotation rate of the rotor is low and the counter electromotive force is small, and therefore, the counter electromotive force is hard to detect and cannot be used as angular position signal (control signal).

In other words, a sensorless structure of a brushless motor becomes effective only after the counter electromotive force becomes so high as it can be easily detected, and after that time, the motor comes into a commutation mode (sensorless mode). In prior arts, it takes about 10 sec., or about 2 sec. if rapid, till a brushless sensorless motor comes into a commutation mode (in the case of a brushless sensorless motor incorporated into a home electric product such as an air conditioner).

However, a motor for an electric pump used in a driving system mounted on a motor vehicle is strictly required that the oil pressure of the electric pump must be built up within 0.2 sec. and the starting ability of the motor in this case is not more than 0.1 sec.

This is because, if built-up of the oil pressure for controlling an automatic transmission or non-stage transmission is slow, a delayed response of the transmission gives an operator a feeling of disorder when abruptly starting from a stopping state, at the time of a shift change or the like. For improving such a responding ability of a transmission, a method is known which comprises providing an accumulator in an oil pressure circuit and always applying a pressure higher than a predetermined value. However, in this case, an oil hydraulic apparatus becomes large in size and therefore, is not suitable to be mounted on a motor vehicle. In addition, it is preferable that the oil hydraulic apparatus not become complicated and expensive.

Another method for preventing such a delay of response may comprise preparing for abrupt starting or the like by keeping the oil pressure higher than a predetermined value even at the stopping time of the motor vehicle. However, for carrying out this method, the electric pump must be operated even at the stopping time of the motor vehicle, which is not preferable from the viewpoint of reduction of energy consumption.

The present invention has been made with such a background. And an object of the present invention is to provide a method and an apparatus for controlling starting of a synchronous motor in which the synchronous motor can start in a very short time.

Another object of the present invention is to provide a method and an apparatus for applying a synchronous motor as a brushless sensorless motor which is a driving source of an electric pump for controlling a working fluid.

A further object of the present invention is to provide an electric pump for controlling a working fluid used in a driving system mounted on a motor vehicle in which a brushless sensorless motor is a driving source.

SUMMARY OF THE INVENTION

The present invention is directed to a method and an apparatus for controlling the start of a synchronous motor having an armature (rotor) and a field coil (stationary part), comprising steps of starting the synchronous motor by supplying an AC current having a predetermined frequency to the field coil of the synchronous motor by an inverter, detecting a terminal voltage of the field coil of the synchronous motor at the time of starting, decreasing a voltage waveform component based on the AC current supplied by the inverter from the detected voltage, correcting a waveform so that a voltage waveform component based on a counter electromotive force can be confirmed, and generating a control signal to be supplied to the inverter using the corrected voltage waveform.

The waveform correcting means can use a circuit for decreasing influence of the voltage waveform by decreasing the voltage waveform component based on the AC current supplied by the inverter from the detected voltage which is a composite waveform consisting the voltage waveform based on the AC current supplied by the inverter and the voltage waveform based on the counter electromotive force of the synchronous motor.

The waveform correcting means includes a voltage dividing circuit having at least two series circuits of resistive elements each connected to a terminal of the synchronous motor and an additional resistive element selectively connected in parallel to one of the resistive elements of the voltage dividing circuit, and the additional resistive element has such a structure that its connection/disconnection is changed over in correspondence with the output waveform of the inverter.

The present invention is further directed to an electric pump for controlling a working fluid used in a driving system or a steering system of a motor vehicle, which includes a pump body for transferring the working fluid, a synchronous motor for rotating the pump body and a driver of the synchronous motor, and the apparatus for controlling starting is adopted in said driver of the synchronous motor.

Figure 1A:
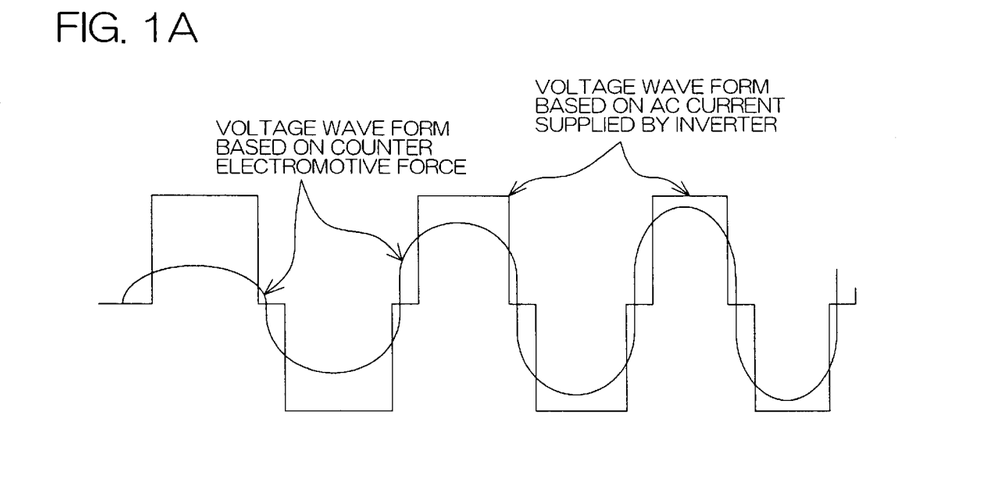
FIGS. 1A, 1B, and 1C are schematic waveform-diagram waveforms diagrams for explaining the principle of the present invention.
Figure 1B:
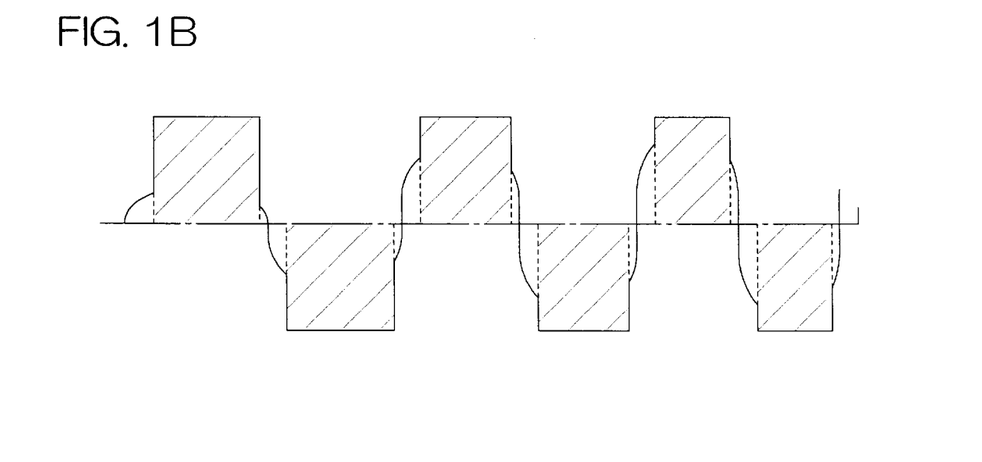

According to the present invention, though a counter electromotive force is small at the starting time of the synchronous motor, a structure is provided so that the small counter electromotive force can be surely detected. That is, as shown in FIG. 1A, at the starting time of the synchronous motor, an AC current of a low frequency is supplied to the field coil from the inverter, and the armature (rotor) is withdrawn and begins to rotate. When the armature rotates, a counter electromotive force is generated, and the amplitude of the counter electromotive force becomes large with the rise of the rotation of the armature. The terminal voltage of the field coil is a composite waveform consisting a voltage waveform based on an AC current supplied by the inverter and a voltage waveform based on the counter electromotive force (FIG. 1B).

Generally, this waveform is integrated in an integrating circuit and used for phase comparison. However, it is disadvantageous that, when the component based on the counter electromotive force is small, the counter electromotive force component has little influence on the integrated waveform if the composite waveform is integrated.

That is, the phase of the voltage based on the counter electromotive force leads the phase of the waveform based on the applied AC current, but the phase lead of the counter electromotive force cannot be detected.

Consequently, according to the present invention, since the waveform based on the AC current supplied by the inverter is a waveform outputted by the inverter itself and therefore, is already known, such a structure is invented that, by eliminating said waveform from the composite waveform, the counter electromotive force component becomes apparent.

Figure 1C:
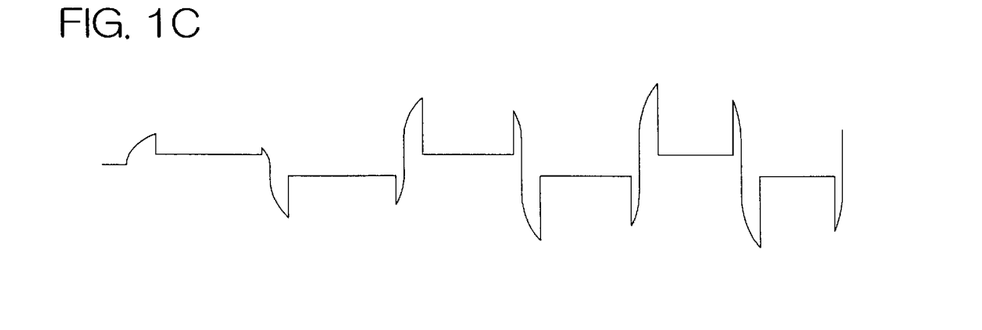

With such the structure, the waveform given to the integrating circuit is as shown in FIG. 1C, and this is a waveform in which the waveform based on the counter electromotive force becomes apparent.

Therefore, even when the rotation rate of the armature (rotor) is low at the starting time of the synchronous motor, the phase difference (phase lead) of the component based on the counter electromotive force can be reflected on the control signal supplied to the inverter, and the synchronous motor can come into a commutation mode (sensorless mode) in a short time immediately after the starting.

As a result, according to the present invention, there can be provided a method and an apparatus for controlling starting of a synchronous motor having an excellent starting ability and capable of coming into a commutation mode in a short time.

Further, according to the present invention, there can be provided a circuit for controlling the start of a synchronous motor suitable as a driving source of an electric pump used in a driving system, a steering system or the like.

Further, according to the present invention, there can be provided an electric pump for use in a driving system, a steering system or the like, which is inexpensive and has an excellent starting ability.

By using the electric pump according to the present invention, the oil pressure reaches a predetermined value in a short time after starting of the pump, and therefore a transmission smoothly operates without delay of response even at the time of, e.g., abrupt starting or shift change, thus preventing an operator from receiving a feeling of disorder.

DESCRIPTION OF THE PREFERRED EMBODIMENTS

Now, embodiments of the present invention will be described in the following with reference to the appended drawings.

Figure 2:
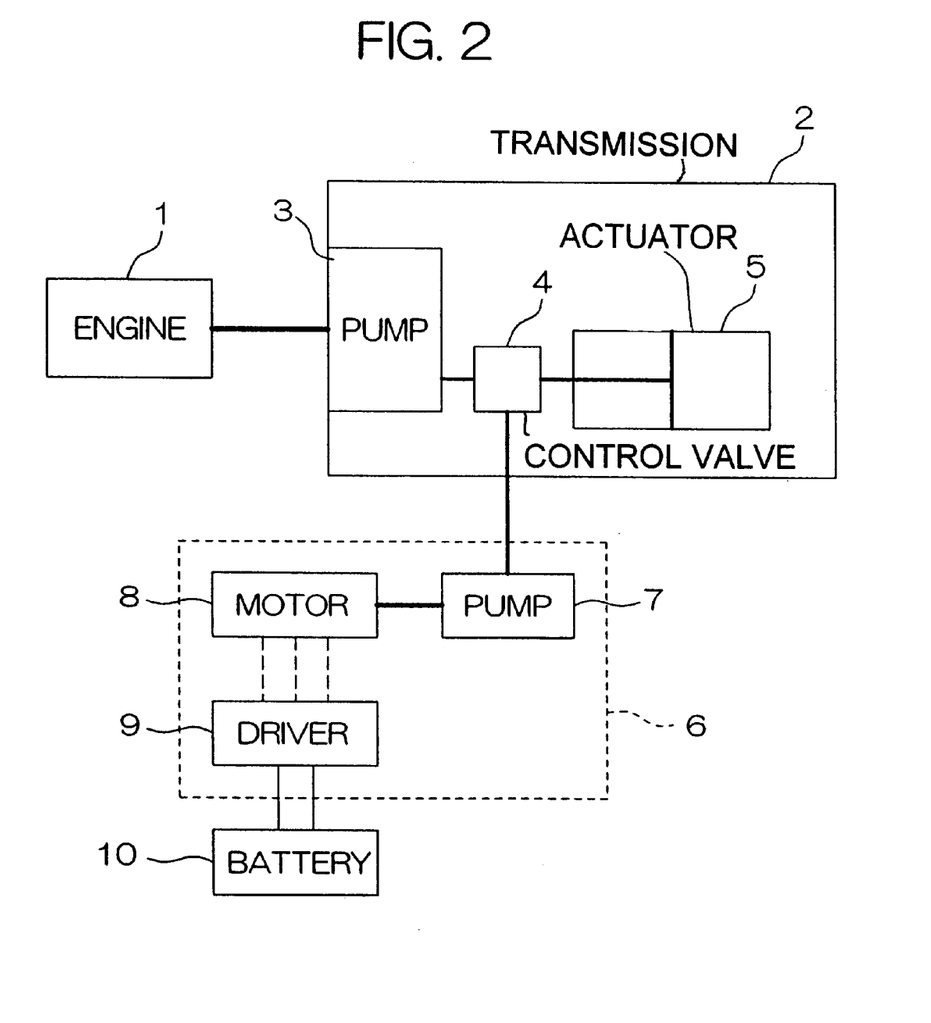
FIG. 2 is a schematic structural diagram of a driving system of a motor vehicle including an electric pump for controlling working fluid according to an embodiment of the present invention.

FIG. 2 is a schematic structural diagram of a driving system (transmission type driving system) of a motor vehicle including an electric pump for controlling a working fluid according to an embodiment of the present invention. A turning force of an engine 1 is given to a main oil pump 3 included in a transmission 2. That is, during driving of the engine 1, the main oil pump 3 is operated by the engine 1. The main oil pump 3 supplies oil to a control valve 4, which is an oil control section. And the control valve 4 gives a control oil pressure to an actuator 5 to perform a predetermined speed change control.

This driving system further includes an auxiliary electric pump 6. The electric pump 6 includes a pump body 7, a motor 8 for driving the pump body 7 and a driver 9 for driving the motor 8, and the driver 9 and the motor 8 are operated by electric power supplied from a battery 10.

When the electric pump 6, or the pump body 7 in more concrete terms, rotates, oil is supplied to the control valve 4, 50 that the control oil pressure and the oil amount given to the actuator 5 are changed and a predetermined speed change control is performed. Otherwise, the predetermined speed change control is performed only by the rotation control of the pump body 7 or a combination of the rotation control of the pump body 7 and the control of the control valve 4.

During the operation of the engine 1, oil is supplied to the control valve 4 by the main oil pump 3. However, when the rotation rate of the engine 1 is low or the engine 1 is stopped, the electric pump 6 is operated to supply oil to the control valve 4.

In the electric pump 6 of this embodiment, a sensorless brushless motor apparatus is adopted as the motor 8 and the driver 9. That is, a synchronous motor, having no sensor for detecting the angular position of its rotor, is used as the motor 8, and the synchronous motor 8 is always highly efficiently operated by the driver 9 so as to show a characteristic equivalent to that of a DC motor.

Figure 3:
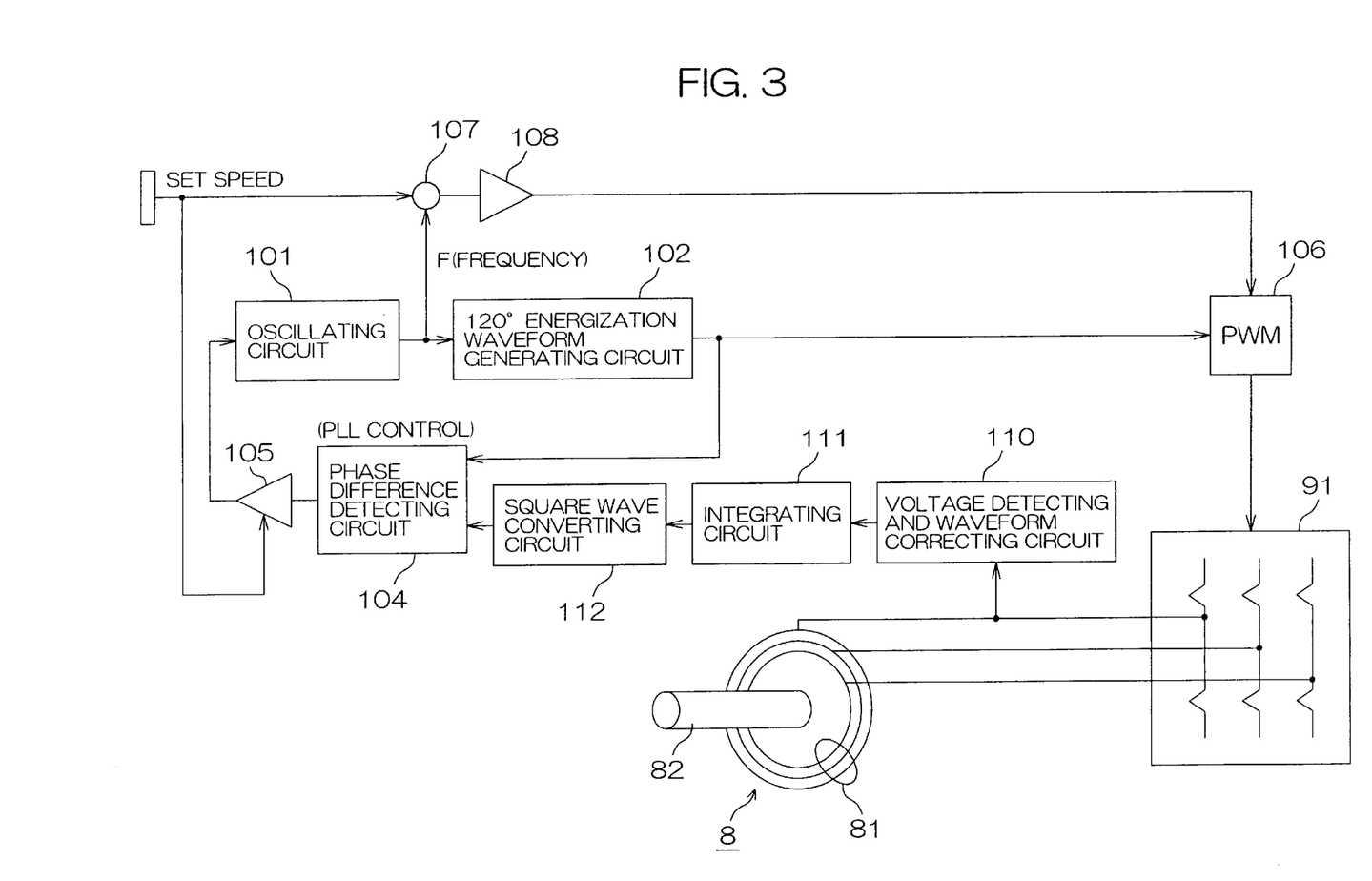
FIG. 3 is a diagram showing a concrete example of a circuit structure of a driver and a synchronous motor in the system of FIG. 2.

Shown in FIG. 3 is an example of a concrete circuit structure of the driver 9 and the synchronous motor 8.

Referring to FIG. 3, a field coil 81 of the synchronous motor 8 is supplied with an AC current from a three-phase inverter circuit 91. A voltage detecting and waveform correcting circuit 110 detects the terminal voltage of the field coil 81. And the waveform of the detected voltage is corrected so that the voltage waveform component based on the counter electromotive force can be confirmed, as mentioned below.

The corrected voltage waveform is integrated in an integrating circuit 111, is further converted into square waves in a square wave converting circuit 112, and is then supplied to a phase difference detecting circuit 104 as one input.

On the other hand, an oscillating output of an oscillating circuit 101, which can be constituted by, e.g., a VCO (Voltage Controlled Oscillator), is supplied to a 120° energization waveform generating circuit 102, to generate a 120° energization waveform for controlling the synchronous motor 8. This waveform is supplied to a PWM (Pulse Width Modulation) circuit 106, an output of which controls the inverter circuit 91.

The voltage phase is taken out from the output of the 120° energization waveform generating circuit 102, and the taken-out voltage phase is supplied to the phase difference detecting circuit 104 as the other input. The phase difference detecting circuit 104 detects the phase difference between two voltages of the output of the square wave converting circuit 112 and the output of the 120° energization waveform generating circuit 102 and outputs the same. This phase difference is amplified by an operation amplifier 105, and fed back to the oscillating circuit 101. Thereby, the oscillating frequency of the oscillating circuit 101 is controlled.

The counter electromotive force generated in the terminal voltage of the field coil 81 of the synchronous motor 8 is thus fed back to the control signal of the inverter 91. Therefore, immediately a counter electromotive force is generated, the output of the 120° energization waveform generating circuit 102 is adjusted based on the counter electromotive force, so that the synchronous motor 8 comes into a commutation mode (sensorless mode) in a short time after starting.

In the circuit shown in FIG. 3, the gain of the operation amplifier 105 is controlled based on a speed setting signal. That is, the gain of the operation amplifier 105 is adapted to be in proportion to the speed setting signal so that the synchronous motor 8 can be accelerated seemingly smoothly. Further, the difference between the output frequency of the oscillating circuit 101 and the setting frequency, which is the speed setting signal, is calculated by a subtracter 107, is amplified by the amplifier 108 and is supplied to the PWM circuit 106. Thereby, the wave height value generated in the 120° energization waveform generating circuit 102 is controlled.

Figure 4:
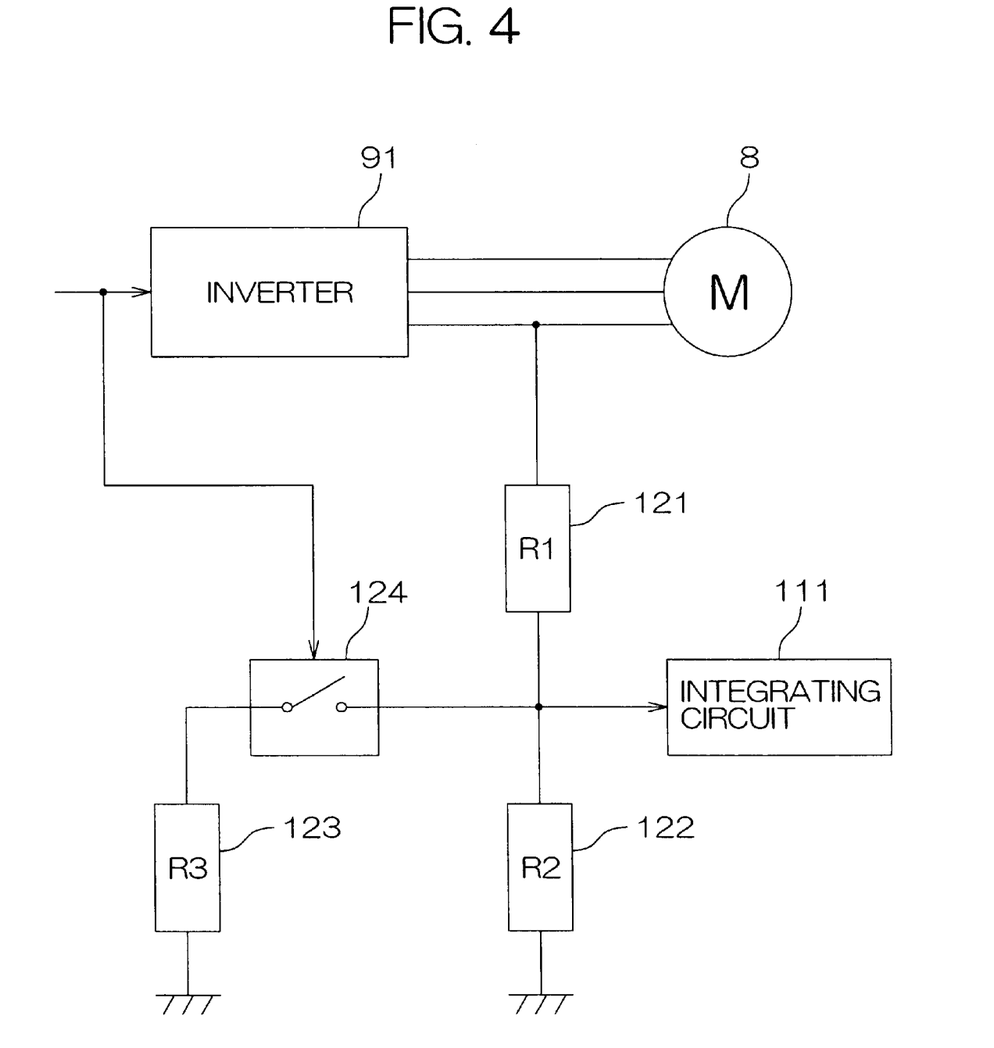
FIG. 4 is a circuit diagram showing a concrete example of a voltage detecting and waveform correcting circuit.

FIG. 4 is a circuit diagram showing an embodiment of the voltage detecting and waveform correcting circuit 110. As shown in FIG. 4, the voltage detecting and waveform correcting circuit 110 can be constituted by, for example, a circuit provided with three voltage dividing resistive element 121-123 and an analog switch 124. The resistive elements 121, 122 are connected with each other in series and one end of the resistive element 121 is connected to an end of the field coil 81 of the synchronous motor 8. Further, the open end of the resistive element 122 is earthed. Thereby, voltages divided based on the resistance ratio of the resistive elements 121, 122 can be detected as the terminal voltages of the field coil 81. And the detected voltage is supplied to the integrating circuit 111 to form an integrated waveform.

In this embodiment, the resistive element 123 is connected in parallel to the resistive element 122. The resistive element 123 is connected to the resistive element 122 through an analog switch 124 so that the resistive element 123 can be connected to or detached from the resistive element 122 at a desired timing. The analog switch 124 is constituted by, for example, a no-contact switch such as a MOS transistor. Further, the analog switch 124 is changed over by a changeover signal of the inverter 91 (signal supplied from the PWM circuit 106).

With such a structure, the voltage division ratio of the voltage detecting circuit changes with turning ON/OFF of the analog switch 124. Therefore, by turning ON the analog switch 124 only while a current is supplied to the synchronous motor 8 from the inverter 91, the voltage division ratio of the resistance is changed so that the influence of the voltage waveform based on the current supplied from the inverter 91 can be reduced.

In other words, as described above with reference to FIGS. 1A, 1B, and 1C, by decreasing the voltage waveform component based on the AC current supplied from the inverter out of the voltage waveform formed at the end of the field coil 81, the waveform correction can be performed so that the voltage waveform component based on the counter electromotive force can be confirmed (FIG. 1C).

Figure 5:
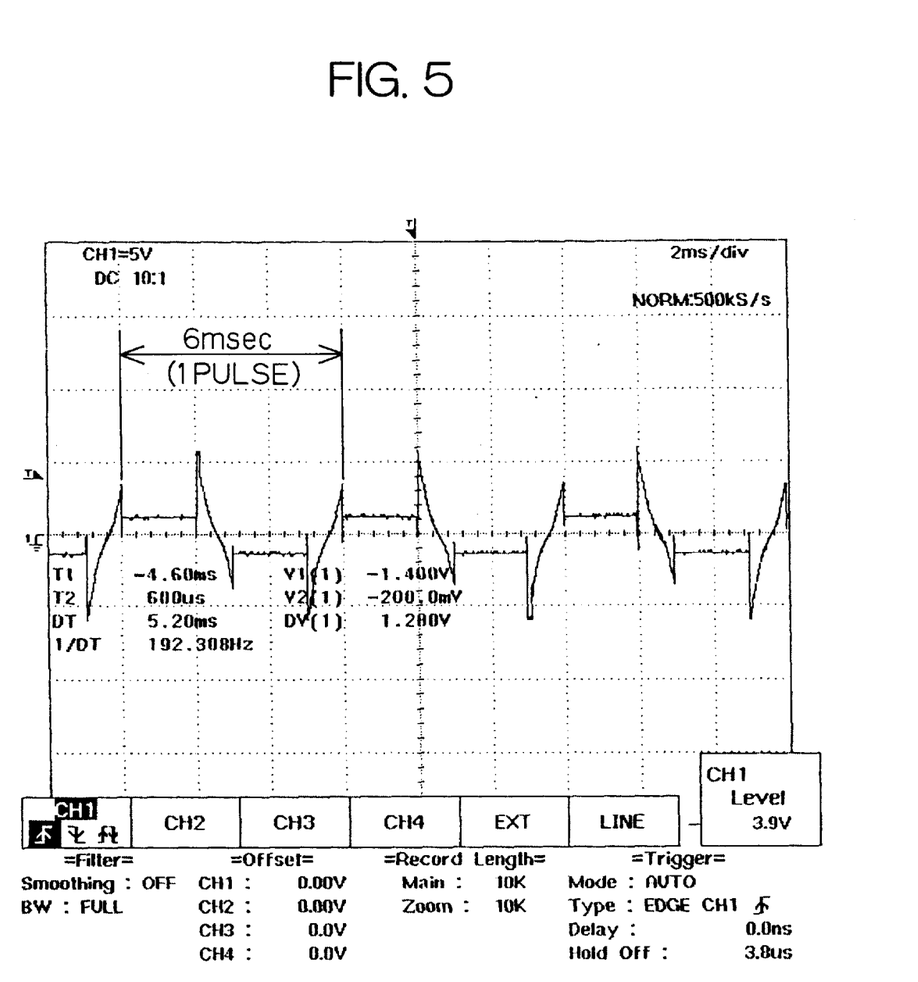
FIG. 5 is a graph showing an example of measurement of an output waveform so corrected that a voltage waveform component by a counter electromotive force can be confirmed.

In FIG. 5, an example of measurement of a corrected output waveform is shown. The waveform shown in FIG. 5 is a measured waveform obtained by using a source voltage of DC 42V in a synchronous motor having eight poles and the maximum output of 315W. Since one pulse is 6 msec in FIG. 5, it is found that the rotation frequency is 2,500rpm.

This waveform is a measurement result obtained when a circuit, in which the resistive element 121 (R1) is 40KΩ and the resistive element 122 (R2) is 20KΩ and the resistive element 123 (R3) is 3.3KΩ, is used as shown in FIG. 4.

As abovementioned, by integrating a corrected electric waveform in the integrating circuit 111, the phase lead of the counter electromotive force component becomes apparent, and it can be utilized in the feedback control.

Figure 6:
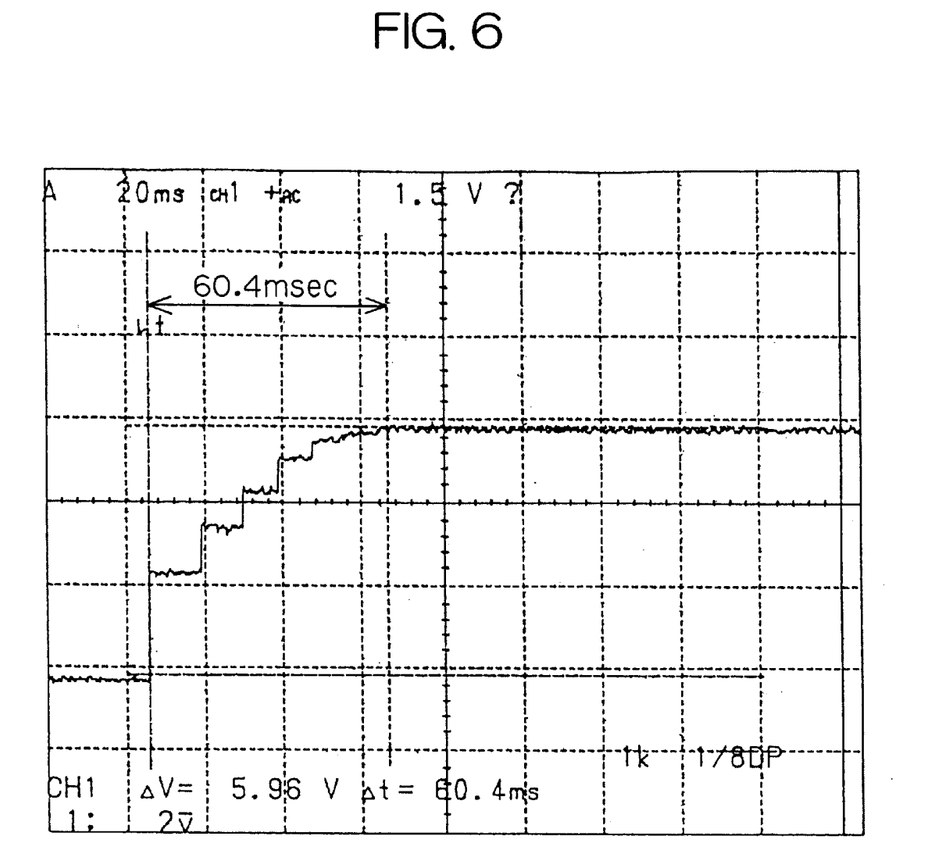
FIG. 6 is a graph showing a measurement result of the starting ability of an embodiment of the present invention.

In FIG. 6, a measurement result of starting ability of an embodiment of the present invention is shown. This figure shows how many minutes is required for the synchronous motor 8 to reach its maximum rotation frequency after energination, in a graph with the abscissa indicating time and the ordinate indicating rotation frequency. As a result of the measurement, it is confirmed that a brushless sensorless motor apparatus according to the present invention comes into a commutation mode (sensorless mode) about 0.06 sec. after starting. This is a result of a no-load test. However, a time delay also occurs even when the pump is loaded, the starting time in this case can be represented by the value obtained by the no-load test.

With the abovementioned structure, according to the present invention, an electric pump can be provided which is suitable as an working fluid supply assisting pump for an automatic transmission apparatus or an oil pressure power steering apparatus of a motor vehicle requiring an especially rapid built-up of oil pressure.

Further, an electric pump can be provided which is suitable as a main pump for supplying an working fluid.

Further, an electric pump can be provided which can be used as a variety of electric pumps requiring a rapid starting ability for other than the apparatus for a motor vehicle abovementioned, for example, a control system such as a brake pump of a motor vehicle.

Furthermore, according to the present invention, there can be provided a starting control apparatus and a method of a synchronous motor which can rapidly start and also rapidly come into a commutation mode.

The present invention is not limited by the abovementioned embodiments but can be variously changed within the scope of the appended claims.

The application claims priority benefits under the treaty of Japanese Patent Application Serial No. 2001-44677 filed with the Japanese Patent Office on Feb. 21, 2001, the disclosure of which is incorporated by reference.

What is claimed is:

1. A method for controlling starting of a synchronous motor having an armature (rotor) and a field coil (stationary part) comprising steps of
starting the synchronous motor by supplying an AC current having a predetermined frequency to the field coil of the synchronous motor by an inverter,
detecting a terminal voltage of the field coil of the synchronous motor at the time of starting,
decreasing influence of a voltage waveform by decreasing a voltage waveform component based on the AC current supplied by the inverter from the detected voltage which is a composite waveform consisting of the voltage waveform based on the inverter-supplied AC current and the voltage waveform based on a counter electromotive force of the synchronous motor, so that the voltage waveform component based on a counter electromotive force can be confirmed, and
generating a control signal to be supplied to the inverter using the corrected voltage waveform.

2. An apparatus for controlling starting of a synchronous motor having an armature (rotor) and a field coil (stationary part), comprising
an inverter for supplying an AC current having a predetermined frequency based on a control signal to the field coil of the synchronous motor,
a voltage detecting means for detecting a terminal voltage of the field coil of the synchronous motor,
a waveform correcting means for correcting the voltage detected by the voltage detecting means by decreasing influence of a voltage waveform based on the AC current supplied by the inverter so that the voltage waveform based on a counter electromotive force can be confirmed, and
a control signal generating means for generating the control signal to be supplied to the inverter using the voltage waveform corrected by the waveform correcting means, wherein the waveform correcting means is a circuit for decreasing influence of the voltage waveform by deceasing the voltage waveform component based on the AC current supplied by the inverter from the detected voltage which is a composite waveform consisting of a composite of the voltage waveform based on the AC current supplied by the inverter and the voltage waveform based on a counter electromotive force of the synchronous motor.

3. Apparatus for controlling starting of a synchronous motor having an armature (rotor) and a field coil (stationary part); comprising an inverter for supplying an AC current having a predetermined frequency based on a control signal to the field coil of the synchronous motor, a voltage detecting means for detecting a terminal voltage of the field coil of the synchronous motor, a waveform correcting means for correcting the voltage detected by the voltage detecting means by decreasing influence of a voltage waveform based on the AC current supplied by the inverter so that the voltage waveform based on a counter electromotive force can be confirmed, the waveform correcting means including a voltage dividing circuit having at least two series circuits of resistive elements each connected to a terminal of the synchronous motor and an additional resistive element selectively connected in parallel to one of the resistive elements of the voltage dividing circuit, connection and disconnection of the additional resistive element being changed over in correspondence with the output waveform of the inverter, and a control signal generating means for generating the control signal to be supplied to the inverter using the voltage waveform corrected by the waveform correcting means.

4. An electric pump for controlling a working fluid used in a driving system or a steering system of a motor vehicle, comprising:

a pump body for transferring the working fluid;

a synchronous motor for rotating the pump body; and a driver of the synchronous motor, wherein the apparatus for controlling starting of the synchronous motor as claimed in claim 2 is used in said driver of the synchronous motor.

5. An electric pump for controlling a working fluid used in a driving system or a steering system of a motor vehicle, comprising:

a pump body for transferring the working fluid;

a synchronous motor for rotating the pump body; and a driver of the synchronous motor, wherein the apparatus for controlling starting of the synchronous motor as claimed in claim 4 is used in said driver of the synchronous motor.

* * * * *